United States Patent Office 2,901,371
Patented Aug. 25, 1959

2,901,371

SIZING COMPOSITIONS CONTAINING FATTY ACID

Herbert G. Arlt, Jr., Glenbrook, Conn., assignor to American Cyanamid Company, New York, N.Y., a corporation of Maine No Drawing. Application June 12, 1957
Serial No. 665,125

5 Claims. (Cl. 106—243)

The present invention relates to ketene-dimer compositions useful in the manufacture of sized paper. The invention includes ketene dimer-fatty acid blends as new compositions of matter, the blends in the form of aqueous emulsions, and the methods involved in the preparation of the blends and the emulsions. The term "emulsion" is used in this specification in its customary sense to designate dispersions both of the liquid-in-liquid and solid-in-liquid types.

It is known that emulsions of hydrophobic water-insoluble ketene dimers are useful as sizing agents in the manufacture of paper; cf. U.S. Patents Nos. 2,627,477, 2,762,270 and 2,785,067. According to these patents the ketene dimer emulsions are prepared by use of emulsifying agents which are hydrophilic and water-soluble in character. The evidence is that these hydrophilic agents are adsorbed by the fibers to some extent in the sizing step and, being water-soluble, act as rewetting agents when the paper, after drying, is contacted with water. The presence of a rewetting agent in paper tends to negative sizing.

The discovery has now been made that superior results in terms of water and lactic acid resistance imparted are obtained when the ketene dimer is emulsified in the presence of a higher fatty acid as emulsifying agent. This discovery was unexpected for the reasons that the higher fatty acids are substantially water-insoluble and are generally not regarded as emulsifying agents.

The invention thus rests primarily on the discovery that a blend of a hydrophobic water-insoluble ketene dimer with a small amount of a water-insoluble higher fatty acid is self-emulsifying and that emulsions thereof are of superior effectiveness and utility in the manufacture of sized paper. Paper obtained therewith has no polyvalent metal or wax content and is suitable as containers for dairy products. The ketene dimer size in the paper is chemically bound and cannot be removed by vegetable or animal oils.

The amount of higher fatty acid present in compositions of the present invention is less than 5% by weight thereof but is sufficient to act as emulsifying agent for the ketene dimer and as stabilizing agent for the resulting emulsion. The invention includes the ketene dimers having the fatty acid dissolved therein and further includes blends consisting essentially of the ketene dimer in free-flowing particulate form in admixture with the fatty acid in similar form.

The emulsions of the present invention consist essentially of a dispersion of the dimer in a continuous aqueous phase. The fatty acid acts as emulsion stabilizer, but its distribution in the system is not known.

The emulsions may be made in general by forming a blend of the dimer and fatty acid in fluid form and emulsifying the blend with water having a temperature at least about equal to the flow point of the blend. The fluid blend may be formed by melting the components or by use of a solvent. It is within the scope of the invention, however, to add the fatty acid and the ketene dimer separately to the water in either order. Stability is improved by homogenizing the emulsion while hot followed by immediate rapid cooling to a temperature below the flow point of the blend.

The emulsions of the present invention are stable. They cream only slightly on standing and can be reconstituted by shaking or by equivalent agitation.

The reason why the higher fatty acids are such effective emulsifying agents and emulsion stabilizers for ketene dimers is not known and why the ketene dimer emulsions prepared therewith are such effective sizing agents for paper is not known and the applicant does not wish to be bound by any theory. The evidence is, however, that the higher fatty acids, which are substantially water-insoluble, have at most negligible capacity as rewetting agents.

Hydrophobic water-insoluble ketene dimers cannot be formed into stable emulsions by themselves, and such transient emulsions have negligible value as sizing agents.

The ketene dimers to which the present invention is directed are water-insoluble and have the theoretical formula as shown in Technical Association of the Pulp and Paper Industry (TAPPI) 39, 21–23 (1956)

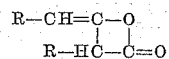

wherein the side chains represented by R—CH= and R— are the same or different hydrophobic hydrocarbon radicals.

Any water-insoluble fatty acid may be used as emulsifying agent and stabilizer in the present invention. The fatty acid may be a mono-unsaturated fatty acid, for example, oleic acid and behenic acid or a diene acid such as linoleic acid or linolenic acid. Laboratory tests indicate that somewhat better results are obtained in the case of higher fatty acids of the saturated series. In general, by water-insoluble I mean that the fatty acid should have a solubility of less than 1% and preferably less than 0.5% by weight in water at room temperature.

The invention does not depend upon the particular ketene dimer or fatty acid employed or the particular methods in which the two are formed into an emulsion. The pH of the emulsions as prepared are normally substantially neutral or faintly acid and need not be adjusted. The emulsions contain supplementary materials consonant with the above, thus the emulsions may contain in suspension emulsified hydrocarbon wax, fillers such as clay and calcium carbonate, and pigments or opacifiers including titanium dioxide and ultramarine blue. The dispersed ketene dimer may contain a solvent such as benzene, toluene, xylene, etc., to extend the sizing action and decrease the flow point of the dimer.

The emulsions of the present invention thus consist essentially of higher ketene dimer and higher fatty acid but may contain as inert components any of the water-insoluble materials heretofore incorporated in non-ionic paper sizing emulsions.

The invention will be more particularly described with reference to the examples which follow. These examples illustrate the invention and are not to be construed as limitation thereon.

*Example 1*

The following illustrates the preparation of a number of blends of higher aliphatic hydrophobic water-insoluble ketene dimers with higher fatty acids in accordance with the present invention.

The ketene dimers used as raw materials were prepard in substantially pure form according to a standard method by heating an appropriate fatty acid chloride in toluene solution at 50° C. with an excess of triethylamine as acid acceptor until reaction of the fatty acid chloride had substantially ceased, i.e., for about four hours. The triethylamine hydrochloride was then filtered off. The reaction product was shaken with an excess of 5% aqueous potassium bicarbonate solution for about 10 minutes to convert any fatty acid chloride, fatty acid anhydride or fatty acid present to water-soluble soap form. The aqueous phase was removed which also removed any unreacted amine present, and the ketene dimer residue washed three times by shaking with 0.5% potassium carbonate solution with intermediate aqueous phase removal. The product was dried under vacuum. The product contained no free fatty acid or fatty acid anhydride as shown by infra-red examination, was free from toluene, and gave a neutral solution when dispersed in distilled water. The following fatty acid chlorides were reacted in this manner: octadecanoyl chloride, oleoyl chloride, palmitoyl chloride, hexadecanoyl chloride, 4-phenylbutyryl chloride, and linoleoyl chloride.

Self-emulsifiable ketene dimer-fatty acid blends were prepared according to the present invention by melting 25 gm. samples of the ketene dimers prepared as described above and adding fatty acid as emulsifier in amounts shown in the table below. In each instance the fatty acid dissolved with a little stirring apparently forming a stable solution. For convenience the ketene dimers are identified in terms of the fatty acid chloride from which they are prepared.

| No. | Ketene Dimer | Fatty Acid Added As Emulsifier | |
|---|---|---|---|
| | | Name | Percent [1] |
| 1 | From octadecanoyl chloride | Stearic | 3 |
| 2 | ----do---- | ----do---- | 2 |
| 3 | ----do---- | Lauric | 2 |
| 4 | From oleoyl chloride | Stearic | 2 |
| 5 | ----do---- | Oleic | 2 |
| 6 | From palmitoyl chloride | Stearic | 2 |
| 7 | ----do---- | Oleic | 2 |
| 8 | From 4-phenylbutyryl chloride | Linoleic | 2 |
| 9 | From linoleoyl chloride | ----do---- | 2 |

[1] Based on weight of ketene dimer.

Each of the above blends was formed into an emulsion by slowly pouring 20 gm. of the molten dimer into 200 cc. of hot water which was rapidly agitated in a Hamilton-Beach mixer, homogenizing the resulting emulsion while hot, and rapidly cooling. Emulsions were obtained which were stable over several weeks. They tended to cream on standing but were reconstituted when stirred or shaken momentarily.

An attempt was made to emulsify the pure ketene dimers themselves in the same manner. However, the emulsions separated into layers after a few minutes and could not be reconstituted by stirring or shaking.

*Example 2*

The following illustrates the preparation of a solid self-emulsifying blend of a hydrophobic ketene dimer and a higher fatty acid.

A 25-gm. sample of pure palmitoyl ketene dimer (product No. 6 of Example 1) was ground in a mortar and pestle along with 1.0 gm. of stearic acid (2%) using dry ice as grinding aid. Sublimation of the dry ice left a free-flowing highly particulate mixture which rapidly emulsified when poured into 300 cc. of rapidly agitated hot water. The emulsion was stable.

*Example 3*

The following illustrates the preparation of a solid homogeneous self-emulsifiable blend of a higher ketene dimer and a higher fatty acid.

A 25-gm. sample of the octadecyl ketene dimer-stearic blend of Example 1 (product No. 2) was ground by the method of Example 2. A free-flowing powder was obtained which emulsified at once when poured into rapidly agitated hot water.

*Example 4*

The following illustrates the manufacture of sized paper according to the present invention using the emulsions prepared from blends Nos. 1, 5 and 6 of Example 1. As control, a portion of the pure parent ketene dimer was emulsified and used at once, before emulsion could separate.

The emulsions were tested in accordance with standard laboratory procedure by diluting to 1% solids with water, adding 0.5% of the emulsions to aliquots of a well beaten bleached sulfite-bleached hardwood kraft (50/50 ratio) pulp at pH 4.5 and 0.6% consistency (emulsion solids based on the dry weight of the fibers), stirring the aliquots gently for five minutes to allow adsorption of the ketene dimer to go to substantial equilibrium, adjusting the pH to 8, forming handsheets at 50 lb. basis weight (25" x 40"/500) and curing the handsheets for 10 hours at 100° C. The handsheets were conditioned for 24 hours at 73° F. and 50% relative humidity and their resistance to penetration by hot aqueous lactic acid determined.

Results are as follows.

| No.[1] | Size Blend | | $H_2O$ Absorption, Percent [2] | Lactic Acid (Penescope) [3] |
|---|---|---|---|---|
| | Ketene Dimer | Fatty Acid Added as Emulsifier | | |
| Control | None | None | 120.0 | Instantaneous. |
| Do | From octadecanoyl chloride | ----do---- | 40.0 | Do.[4] |
| 1 | ----Do---- | Stearic | 34.0 | >1,000. |
| 5 | From oleoyl chloride | Oleic | | >1,000. |
| 6 | From palmitoyl chloride | Stearic | | >1,000. |

[1] See Example 1.
[2] Percent water absorbed in 15 minutes based on dry weight of paper.
[3] Seconds to penetrate.
[4] Paper showed some spotty sizing.

I claim:

1. A self-emulsifying composition of matter useful in the manufacture of sized paper consisting essentially of a blend of a higher aliphatic hydrophobic water-insoluble ketene dimer and a sufficient amount, less than 5% by weight thereof, of a higher fatty acid as emulsifying agent and emulsion stabilizer, said ketene dimer having side chains composed of hydrogen and carbon atoms only.

2. A self-emulsifying composition of matter useful in the manufacture of sized paper consisting essentially of a higher aliphatic hydrophobic water-insoluble ketene dimer having dissolved therein a sufficient amount, less than 5% by weight thereof, of a higher fatty acid as emulsifying agent and emulsion stabilizer, said ketene dimer having side chains composed of hydrogen and carbon atoms only.

3. A composition according to claim 2 wherein the ketene dimer is normally solid and the composition is in free-flowing particulate form.

4. A sizing agent for paper consisting essentially of an emulsion of a higher aliphatic hydrophobic water-insoluble ketene dimer in a continuous aqueous phase, said emulsion containing a higher fatty acid as sole emulsifying agent and emulsion stabilizer, the weight of said fatty acid being less than 5% of the weight of said ketene dimer, said ketene dimer having side chains composed of hydrogen and carbon atoms only.

5. A method of making a sizing agent for paper which consists essentially in forming a fluid blend of a higher aliphatic hydrophobic water-insoluble ketene dimer and a higher fatty acid, the weight of said faty acid being less than 5% of the weight of said dimer, and emulsifying said blend with water, said ketene dimer having side chains composed of hydrogen and carbon atoms only.

References Cited in the file of this patent

UNITED STATES PATENTS 2,627,477    Downey _____ Feb. 3, 1953

OTHER REFERENCES

Gregman et al.: "Jour. Am. Chem. Soc." 77 (1955).